(12) United States Patent
Ozawa

(10) Patent No.: US 7,372,631 B2
(45) Date of Patent: May 13, 2008

(54) METHOD OF MANUFACTURING MICROLENS, MICROLENS, MICROLENS ARRAY, ELECTRO-OPTICAL DEVICE, AND ELECTRONIC APPARATUS

(75) Inventor: Norihiko Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 447 days.

(21) Appl. No.: 11/175,265

(22) Filed: Jul. 7, 2005

(65) Prior Publication Data

US 2006/0046486 A1 Mar. 2, 2006

(30) Foreign Application Priority Data

Sep. 1, 2004 (JP) ............... 2004-254816

(51) Int. Cl.
*G02B 27/10* (2006.01)
*B29D 11/00* (2006.01)

(52) U.S. Cl. ............. 359/619; 359/620; 359/900; 264/1.7; 216/26

(58) Field of Classification Search ........ 359/619–622, 359/626, 599, 463, 455; 264/1.32, 1.7; 216/26, 216/51, 55, 97; 65/17.3
See application file for complete search history.

(56) References Cited

U.S. PATENT DOCUMENTS 6,781,762 B2 * 8/2004 Ozawa ............ 359/619

FOREIGN PATENT DOCUMENTS

JP   A-2000-193928   7/2000

* cited by examiner

*Primary Examiner*—David Spector
*Assistant Examiner*—Jack Dinh
(74) *Attorney, Agent, or Firm*—Oliff & Berridge, PLC

(57) ABSTRACT

A method of manufacturing a microlens includes: forming on a transparent substrate an etching stop layer in a lens formation region where a curved lens surface of the microlens is to be formed, the etching stop layer having an island shape as a planar shape thereof; forming an intermediate layer on the etching stop layer; forming an etching mask layer on the intermediate layer, the etching mask layer having an opening at a position facing the etching stop layer; and etching, by means of isotropic etching, the intermediate layer from the opening, and etching the transparent substrate and the intermediate layer from a side of the etching stop layer.

6 Claims, 11 Drawing Sheets

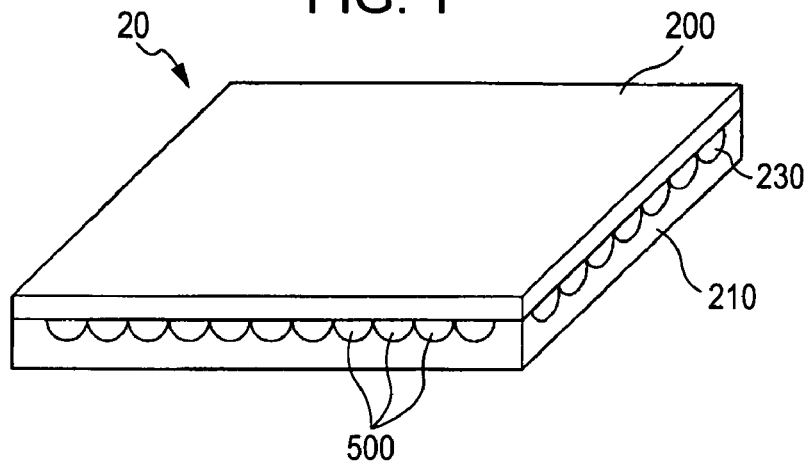
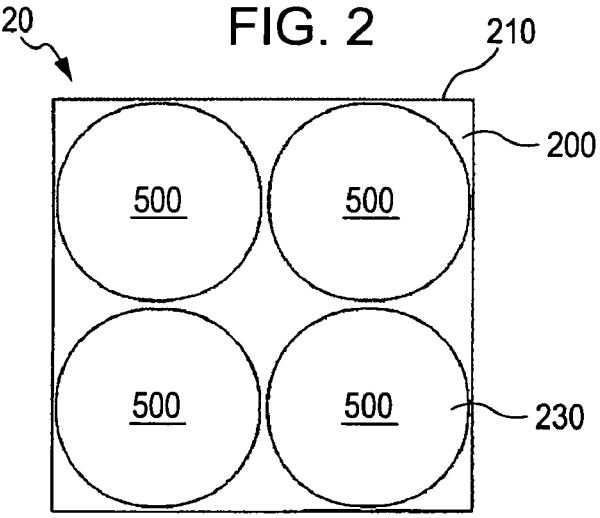
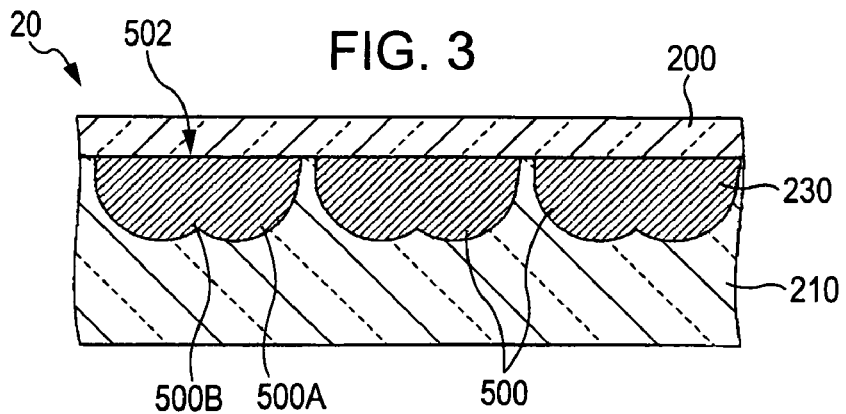

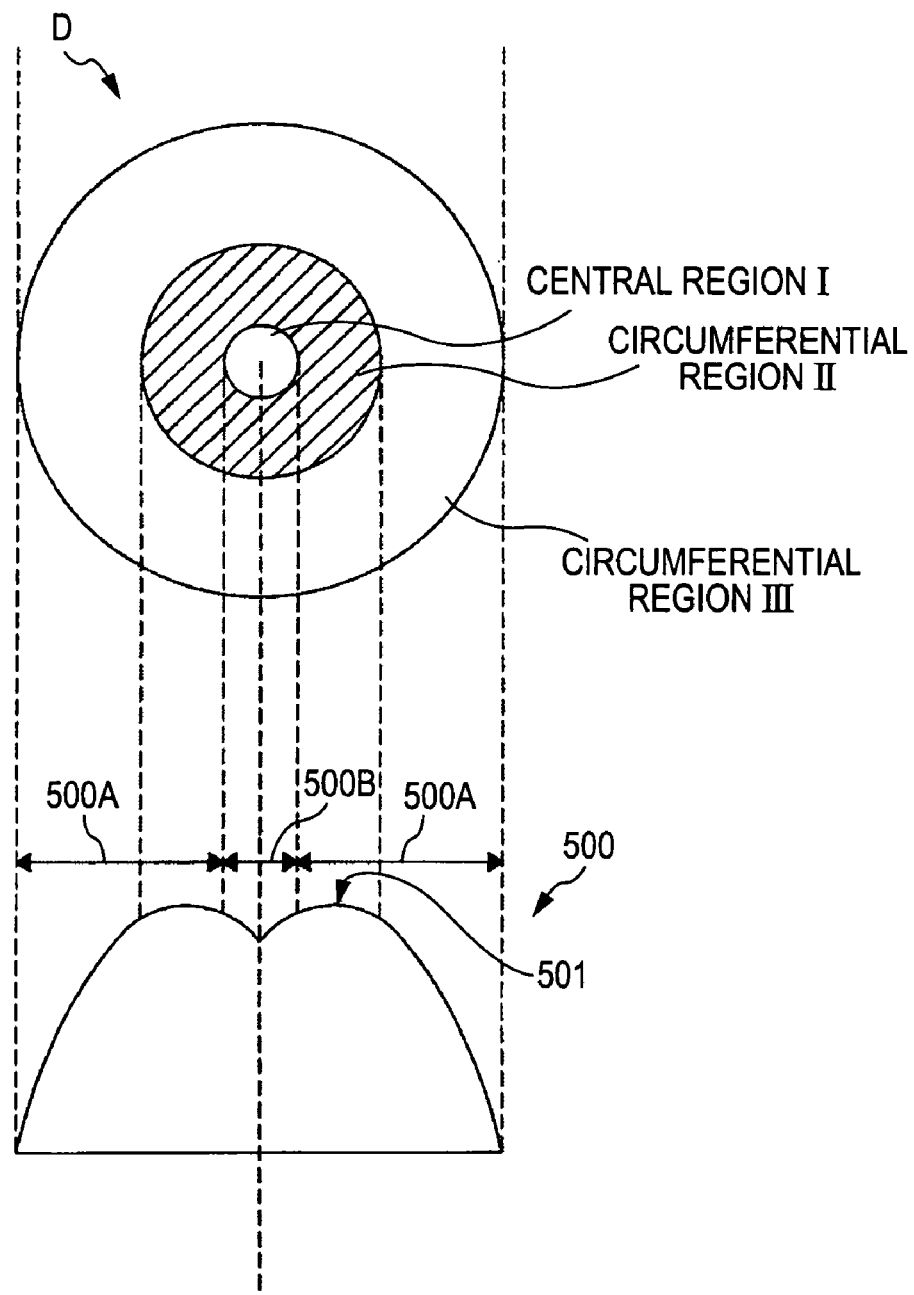

METHOD OF MANUFACTURING MICROLENS, MICROLENS, MICROLENS ARRAY, ELECTRO-OPTICAL DEVICE, AND ELECTRONIC APPARATUS

BACKGROUND OF THE INVENTION

1. Technical Field

The present invention relates to a microlens used for an electro-optical device such as a liquid crystal device, to a microlens array, to a method of manufacturing the same, and to an electro-optical device, and to an electronic apparatus having microlenses.

2. Related Art

In an electro-optical device such as a liquid crystal device, for example, a microlens corresponding to each pixel is formed on a counter substrate or a microlens array plate including a plurality of microlenses is bonded to the counter substrate. By using such a microlens array, a bright display can be realized in an electro-optical device. That is, the microlenses increase the usage efficiency of light emitted from a light source by causing the light emitted from the light source, such as a backlight, to be focused on an opening region of each pixel without wasting any light. For example, a liquid crystal device including such microlenses is manufactured as follows. A counter substrate having a built-in microlens array, and an element substrate where pixel electrodes or switching elements, such as thin film transistors and so forth, are formed at respective pixels are sealed by a bonding resin in a portion excluding the image display region while adjusting a gap therebetween, and liquid crystal is interposed therebetween and then encapsulated.

In the above-described liquid crystal device, it is essential to make the thickness of the liquid crystal layer uniform over the entire liquid crystal panel in order to reduce non-uniform luminance and color shading. Japanese Unexamined Patent Application Publication No. 2000-193928 discloses a technique in which a circumferential part of each microlens is curved while a central part of the microlens is flat. By doing this, the thickness of the resin layer formed on the microlens becomes thin due to the reduced thickness of the microlens, and as a result, thickness variation of the liquid crystal layer is reduced.

In such electro-optical devices, there is a general request for devices with a long lifetime.

However, when a microlens is employed, typically, light emitted from the light source is locally focused via the microlens on a portion positioned at the center of an opening region of each pixel, for example, of a liquid crystal or an orientation layer: the inventors have found that deterioration was significant in this portion.

Further, the related art disclosed in Japanese Unexamined Patent Application Publication No. 2000-193928 is directed to a technique for reducing a thickness variation of the liquid crystal layer: this technique is not regarded as a technique of recognizing deterioration within the pixel region due to focusing, which has been found by the inventors. Furthermore, the inventors expect that the lens characteristics of the microlens are not good because the central portion of the microlens is flat. That is, the microlens disclosed in Japanese Unexamined Patent Application Publication No. 2000-193928 does not focus light incident on the central portion, which is a flat surface, but instead allows the light to be transmitted straight through, so that the central portion does not function as a lens. Accordingly, it is difficult to enhance the light usage efficiency by effectively focusing light within the opening region, so that it is difficult to enhance the display luminance and contrast.

SUMMARY

An advantage of the invention is that it provides a method of manufacturing a microlens capable of suppressing a reduction of the lifetime of a liquid crystal device or the like due to light focused on one point without sacrificing display performance, such as luminance and contrast, and it provides the microlens, a microlens array, an electro-optical device, and an electronic apparatus.

According to an aspect of the invention, a method of manufacturing a microlens includes: forming on a transparent substrate an etching stop layer in a lens formation region where a curved lens surface of the microlens is to be formed, the etching stop layer having an island shape as a planar shape thereof; forming an intermediate layer on the etching stop layer; forming an etching mask layer on the intermediate layer, the etching mask layer having an opening at a position facing the etching stop layer; and etching, by means of isotropic etching, the intermediate layer from the opening, and etching the transparent substrate and the intermediate layer from a side of the etching stop layer.

According to the method of manufacturing the microlens of the invention, an etching stop layer is first formed within a lens formation region on a transparent substrate, such as a quartz substrate or a glass substrate. The etching stop layer has an island shape as a planar shape, on the transparent substrate, and for example, has a smaller size than a lens formation region when the microlens is finally formed through an etching process to be described later. Also, when curved lens surfaces of a plurality of microlens are formed on the transparent substrate, a plurality of etching stop layers dotted in island shapes is formed to correspond to positions of the plurality of microlens which is finally formed.

Subsequently, an intermediate layer is formed on the etching stop layer. The intermediate layer is formed using a general-purpose film formation method such as a CVD method or a sputtering method. Subsequently, an etching mask layer formed with an opening is formed at a position facing the etching stop layer on the intermediate layer. For example, the etching mask layer may be directly formed on the intermediate layer so as to avoid the position facing the etching stop layer. Also, the opening is formed, for example, by forming the etching mask layer so as to cover the entire intermediate layer and then removing a region including the position facing the etching stop layer. As such, after forming the etching stop layer, the intermediate layer, and the etching mask layer on the transparent substrate, the intermediate layer is etched from the opening by an isotropic etching, and the transparent substrate is also etched together with the intermediate layer from a side of the etching stop layer. Specifically, the etching stop layer is exposed as the intermediate layer is etched outward from the opening, and the transparent substrate, which is exposed from a side of the etching stop layer by removing the intermediate layer, is etched to thereby keep etching the intermediate layer.

As a result, a curved lens surface having the specific shape is formed in the transparent substrate by means of the presence of the etching stop layer. Specifically, an etched surface propagating toward an inside of the etching stop layer from the side of the etching stop layer becomes in contact with a lower position of the etching stop layer to form a curved lens surface which is convex toward the etching stop layer. On the other hand, an etched surface propagating toward an outside of the etching stop layer forms a curved lens surface which is convex at a position opposite to the curved lens surface formed at the lower position of the etching stop layer. Since the transparent substrate is etched from the side of the etching stop layer and the lower position of the etched intermediate layer, the above-described curved lens surface constitutes one curved lens surface which is continuously connected in the lens formation region of the transparent substrate.

When the resultant curved lens surface is filled with a resin having an optical transmitting property, a microlens can be formed in which a central portion is more pitted than the circumferential portion. Such a microlens can make both of the central portion of the lens, which is more pitted than circumference, and the circumferential portion around the central portion act as lenses. In addition, light emitted from the light source can be focused on the pixel region by means of the specific curved lens surface, while light can be properly dispersed so as not to make them focused on one point of the pixel region. Accordingly, deterioration of each part of the pixel region due to light focused on one point can be suppressed without sacrificing the optical transmittance in the pixel region. By means of this, the orientation layer within the pixel region can be suppressed from being deteriorated, and a lifetime of the liquid crystal device can increase. Moreover, the etched surface of the etched transparent substrate can be used as the curved lens surface for the microlens without filling the etched surface with a resin or the like.

Further, the method of manufacturing the microlens according to the invention is not limited to a method of manufacturing a microlens included in an electro-optical device such as a liquid crystal device, but may be applied to any electro-optical device only if it has the microlens. Furthermore, the method of manufacturing the microlens according to the invention may form a plurality of microlens by changing the shape of the etching stop layer, or positional relationship, size, and shape of the etching stop layer and the opening.

In the method of manufacturing the microlens according to the aspect of the invention, it is preferable that an etching rate of the intermediate layer be higher than that of the transparent substrate.

According to this aspect, an aspherical curved lens surface can be formed when an etching rate of the intermediate layer is higher than that of the transparent substrate. The intermediate layer is formed by using a general-purpose film formation method such as a CVD method or a sputtering method, and a magnitude relationship of the transparent substrate and an etching rate of the intermediate layer becomes an essential factor of determining the shape of a curved lens surface of the microlens formed through an etching process.

In the method of manufacturing the microlens according to the aspect of the invention, it is preferable that the planar shape of the etching stop layer be circular.

According to this aspect, the transparent substrate is etched from a entire side of the etching stop layer, and is in contact with the etched surface at a lower side of the etching stop layer. Here, the planar shape of the etching stop layer means the shape of the etching stop layer within a surface of the transparent substrate. The contacted etched surface constitutes a smooth curved lens surface along a circumferential direction of the etching stop layer.

In the method of manufacturing the microlens according to the aspect of the invention, it is preferable that the planar shape of the opening be circular.

According to this aspect, the intermediate layer is isotropically etched with the opening as a center. Specifically, the intermediate layer is isotropically etched along the longitudinal direction of the intermediate layer, that is, the direction where the intermediate layer extends on the transparent substrate. By means of this, a desired curved lens surface can be formed on the transparent substrate by setting shape, size, or positional relationship of the opening and the etching stop layer.

In the method of manufacturing the microlens according to the aspect of the invention, it is preferable that the opening and the etching stop layer be coaxially positioned in plan view from the transparent substrate.

According to this aspect, since the opening and the etching stop layer are coaxially positioned in plan view, a distance from the side of the opening to the side of the etching stop layer can be made to be equal along the circumference of the etching stop layer, so that etching can be initiated on the transparent substrate from the side of the etching stop layer with a slight time difference, or from the entire side of the etching stop layer at the same time. More specifically, when planar shapes of the opening and the etching stop layer are, for example, of circle, it is possible to carry out etching on the transparent substrate at the same time from the entire side of the etching stop layer. Here, 'in plan view' means that each of the above-described layers is seen from an upper side of the etching stop layer. Accordingly, by means of etching carried out toward an inside of the etching stop layer from the side of the etching stop layer on the transparent substrate, a curved lens surface having the same radius of curvature along the circumference of the etching stop layer is formed in a concentric shape in plan view. By filling a space surrounded by such a curved lens surface with a lens formation material having an optical transmitting property, it is possible to form a curved lens surface isotropically extending from a center of the opening and the etching stop layer, to detail this, the curved lens surface having a contour line extending in a concentric shape can be formed.

In the method of manufacturing the microlens according to the aspect of the invention, it is preferable that, in the lens formation region, the size of a region where the etching stop layer is formed is larger than the size of a region where the opening is formed.

According to this aspect, etching is carried out from the intermediate layer, being in contact with the opening within the lens formation region, toward the side of the etching stop layer, and the etching is sequentially carried out from the intermediate layer above the etching stop layer till the side of the etching stop layer. By doing this, etching on the transparent substrate is initiated from the side of the etching stop layer, thereby forming a curved lens surface having a concentric shape when seen from a lower plan view of the etching stop layer. In addition, isotropic etching is carried out from the side of the etching stop layer to a periphery thereof, and the entire curved lens surface finally becomes a curved surface having a continuous contour line of a concentric shape.

Further, when an etching rate of the intermediate layer is higher than that of the transparent substrate, curved lens surfaces having different radii of curvature at inside and outside of the etching stop layer can be formed. When wet etching is employed as the isotropic etching, the intermediate layer is etched faster than the transparent substrate, so that the curved lens surface formed at an outside of the etching stop layer can be aspherical. Specifically, a portion of the transparent substrate positioned below the etched intermediate layer has a larger contact region being in contact with an etchant than the rest portion of the transparent substrate, so that the portion of the transparent substrate can be more readily etched by the magnitude of the larger contact region than the rest region. Thereby, the curved lens surface formed at an outside of the etching stop layer can be aspherical. Alternatively, when an etching rate of the intermediate layer is equal to that of the transparent substrate, an etched surface of the etched transparent substrate becomes spherical. By selecting the intermediate layer having an etching rate equal to or higher than that of the transparent substrate, either aspherical surface or spherical surface can be selected as a lens formation surface, so that radius of curvature of a curved lens surface of the microlens can be adjusted to have a desired lens characteristic.

According to another aspect of the invention, a microlens includes: a peripheral lens section that is inclined toward each of external and internal sides of a ridge so as to include the ridge, which extends in a ring shape around a normal line in a single plane and that protrudes from the single plane along the normal line; and a central lens section that is surrounded by the peripheral lens section and is concave toward the single plane along the normal line. In this case, a curved lens surface ranges from a surface of the peripheral lens section to a surface of the central lens section.

According to the microlens of the invention, by making surfaces of the peripheral lens section and the central lens section curved lens surfaces, one region of the curved lens surface can be protruded from one plane while another region of the curved lens surface can be pitted toward the one plane. According to this curved lens surface, an optical intensity distribution of light focused on a two-dimensional plane by the surface of the peripheral lens section are first present along the circumferential direction of the optical intensity distribution of light focused on the same two-dimensional plane by the surface of the central lens section. That is, by making the central lens section and the peripheral lens section focus light, light incident on the region of forming the same can be focused on one microlens while the light can be dispersed within the opening region of the pixel corresponding to the one microlens without being focused on one point.

According to still another aspect of the invention, a microlens includes: a peripheral lens section that is inclined toward each of external and internal sides of a ridge so as to include the ridge, which extends in a ring shape around a normal line in a single plane and that has a first curved lens surface protruding from the single plane along the normal line; and a central lens section that is surrounded by the peripheral lens section and continuously connected to the first curved lens surface and that has a second curved lens surface concave toward the single plane along the normal line.

According to the microlens of the invention, by means of the peripheral lens section having the first curved lens surface and the central lens section having the second curved lens surface, light can be dispersed so as not to be focused on one point. Here, 'one plane' according to the invention means bottom surfaces of the central lens section and the peripheral lens section, that is, a bottom surface of the microlens. The peripheral lens section extends around the normal line in the bottom surface of the microlens, and a ridge of the peripheral lens section extends around the normal line in a ring shape. The peripheral lens section has the first curved lens surface which is inclined toward each of inside and outside of the ridge, and is protruded from the bottom surface of the microlens along the normal of the bottom surface. In the meantime, the central lens section is surrounded by the peripheral lens section, and has the second curved lens surface which is continuously connected to the first curved lens surface. The second curved lens surface is pitted toward the one plane unlike the first curved lens surface. Specifically, when the microlens is seen in plan view, it has the first curved lens surface and the second curved lens surface surrounded by the first curved lens surface, and these curved surfaces are continuously connected to each other, thereby smoothly forming one curved lens surface. In addition, the pitted part of the central lens section includes a part combined with the peripheral lens section at one point toward the center of the microlens, and a bottom of the pitted part which is slightly expanded.

According to the central lens section and the peripheral lens section, an optical intensity distribution of light focused on a two-dimensional plane by the peripheral lens section is present along a circumferential direction of the optical intensity distribution of light focused on a two-dimensional plane by the central lens section. That is, by making the central lens section and the peripheral lens section focus light, respectively, light incident on the region of forming the same can be focused on one microlens, and can be dispersed so as not to make the light focused on one point within an opening region of the pixel corresponding to the one microlens. According to the microlens of the invention, each of the peripheral lens section and the central lens section can act as a lens having another first curved lens surface and second curved lens surface while the entire microlens can act as one lens. Accordingly, the light incident on the microlens can be effectively focused within a predetermined region, for example, an opening region of each pixel while light can be properly dispersed, so that a lifetime of the liquid crystal device can increase while enhancing display luminance and contrast.

In the microlens according to the aspect of the invention, it is preferable that the peripheral lens section and the central lens section be coaxially formed with the normal line as a center axis.

According to this aspect, the peripheral lens section is concentrically positioned around the central lens section in plan view. Light focused by such central lens section and peripheral lens section shows an optical intensity distribution in which light is concentrically distributed, and light can be suppressed from being focused on one point.

In the microlens according to the aspect of the invention, it is preferable that the first curved lens surface have a radius of curvature different from the second curved lens surface.

According to this aspect, an optical intensity distribution can be adjusted according to a difference between radii of curvature of the first and second curved lens surfaces, so that the optical intensity distribution on the orientation layer positioned in the pixel region can be adjusted so as not to make the distribution strong on one point. In addition, it is possible to effectively make light focused on the entire pixel region and to disperse the optical intensity distribution within the pixel region.

In the microlens according to the aspect of the invention, it is preferable that a cross-sectional shape of the first curved lens surface in a plane orthogonal to a direction extending from the ridge be spherical or aspherical.

According to this aspect, since a cross-sectional shape of the first curved lens surface is spherical or aspherical, an optical intensity distribution of the focused light can be dispersed while the thickness of the microlens can be designed to have a desired one. In particular, when the first curved lens surface is aspherical, it is possible to make light focused in a specific range and to make the thickness of the microlens thin.

According to still another aspect of the invention, a microlens array includes a plurality of the above-described microlens.

According to the microlens array of the invention, light can be suppressed from being focused on one point without sacrificing an optical transmittance of the pixel region as is the same as the above-described microlens. In particular, the microlens array where each microlens is arranged to face each pixel of the electro-optical device can enhance a luminance of the pixel by making light focused on each pixel and can also suppress each part of the pixel region from being deteriorated due to the focusing.

According to still another aspect of the invention, an electro-optical device includes the above-described microlens.

According to the microlens of the invention, light can be suppressed from being focused on one point without sacrificing an optical transmittance of the pixel region as is the same as the above-described microlens. Accordingly, an electro-optical device having a good display performance can be provided. Further, the electro-optical device according to the invention is configured to have a microlens having a good lens characteristic as described above, so that usage efficiency can be enhanced by the microlens, and an optical transmittance and a contrast at each pixel can also be enhanced. Accordingly, the electro-optical device according to the invention has a long lifetime and is also capable of displaying an image with a high quality.

According to still another aspect of the invention, an electronic apparatus has the above-described electro-optical device.

According to the electronic apparatus of the invention, it is configured to have the above-described electro-optical device according to the invention, so that various electronic apparatuses, such as a projection type display, a liquid crystal TV, a cellular phone, an electronic note, a word processor, a view finder type or monitor direct view type video tape recorder, a workstation, a picture phone, a point of sale (POS) terminal, a touch panel and so forth, having a long lifetime and capable of displaying an image with a high quality can be implemented. In addition, a display using a field emission device (field emission display and surface-conduction electronic-emitter display), digital light processing (DLP) display may be implemented as the electronic apparatus according to the invention as well as the electrophoresis device such as an electronic paper.

Such operations and other advantages of the invention will be apparent from the following embodiments to be described.

BRIEF DESCRIPTION OF THE DRAWINGS

The invention will be described with reference to the accompanying drawings, wherein like numbers reference like elements, and wherein:

FIG. 1 is a perspective view illustrating a structure of a microlens array plate according to a present embodiment;

FIG. 2 is an enlarged plan view illustrating adjacent microlenses among microlenses according to the present embodiment;

FIG. 3 is an enlarged view illustrating a main part of the cross-section of the microlens array plate according to the present embodiment;

FIG. 12 is a view illustrating a relationship between a light intensity distribution and the shape of a microlens according to the present embodiment;

DESCRIPTION OF THE EMBODIMENTS

Figure 4A:
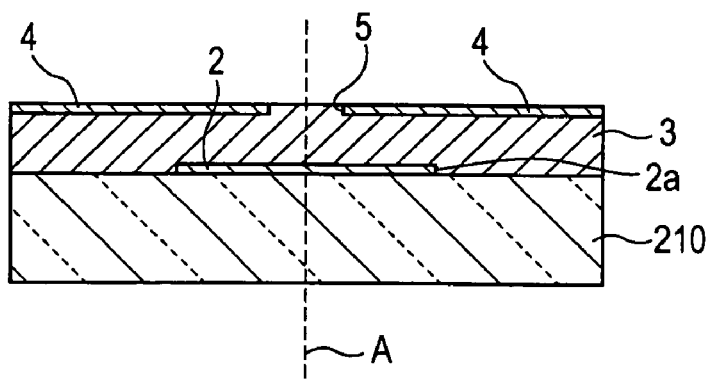
FIG. 4A is a process cross-sectional view (in particular, 1) illustrating a process of manufacturing a microlens according to the present embodiment.

Hereinafter, a microlens manufacturing method, a microlens, a microlens array, an electro-optical device, and an electronic apparatus in accordance with the invention will be described in detail with reference to the accompanying drawings.

Microlens Array Plate

First, a microlens plate to which a microlens according to the invention is applied will be described with reference to FIGS. 1 to 3. FIG. 1 is a perspective view schematically illustrating a microlens array plate according to the present embodiment. FIG. 2 is an enlarged plan view illustrating a part associated with four adjacent microlenses among microlenses included in the microlens array plate. FIG. 3 is an enlarged view illustrating a part of the cross-section of the microlens array plate in accordance with the present embodiment.

Referring to FIG. 1, the microlens array plate 20 of the present embodiment is configured to include a plurality of microlenses 500 which are arranged in a planar matrix on a transparent plate member 210, which is an example of the 'transparent substrate' according to the invention. The transparent plate member 210 is, for example, a quartz substrate or the like, and has a plurality of concave pits in a matrix form. An adhesive made of, for example, a photosensitive resin material, is filled within the concave pits formed in the transparent plate member 210. The adhesive is cured to form an adhesive layer 230, which adheres a cover glass 200 disposed to cover the transparent plate member 210 and the transparent plate member 210 to each other. The adhesive for adhering the cover glass 200 to the transparent plate member 210 is, for example, a transparent adhesive layer having a refractive index higher than that of the transparent plate member 210.

Referring to FIGS. 2 and 3, a curved lens surface of the microlens 500 is approximately defined by the transparent plate member 210 and the adhesive layer 230, which have different refractive indexes from each other. The microlens 500 is configured as a convex lens substantially protruding from its lower part in FIG. 3.

The microlens 500 according to the present embodiment is manufactured by a novel method of the invention, as will be described later, and the curved lens surface of the microlens 500 is configured to include a peripheral lens section 500A and a central lens section 500B having different radii of curvature from each other. The peripheral lens section 500A corresponds to the periphery of the microlens 500 and protrudes downward in the figure. The central lens section 500B is a portion inside the peripheral lens section 500A among portions constituting the microlens 500, and corresponds to a convex portion that protrudes upward in the figure. Specifically, the central lens section 500B corresponds to a portion including the curved lens surface that is concave toward the bottom surface 502 of the microlens 500.

The microlens array plate 20, when it is used, has the microlens 500 disposed to correspond to each pixel of an electro-optical device, such as a liquid crystal device, to be described later. Accordingly, light incident on each microlens 500 is focused toward the center of each pixel in the electro-optical device by means of refraction of the microlens 500. The structure of the microlens 500 will be described later in detail.

Method of Manufacturing a Microlens

Figure 6A:
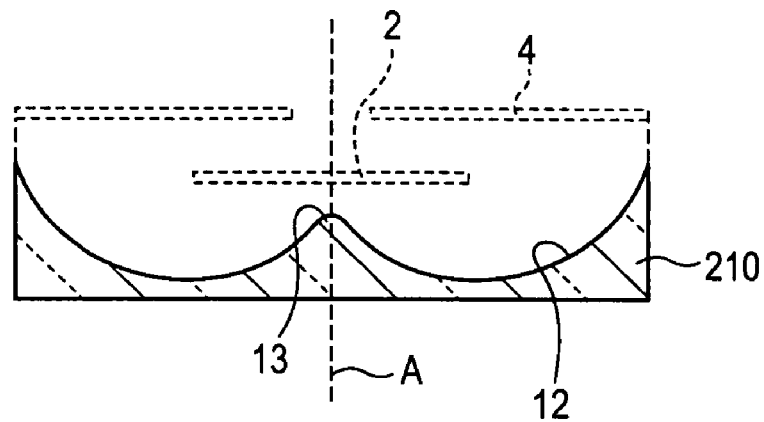
FIG. 6A is a process cross-sectional view (in particular, 3) illustrating a process of manufacturing a microlens according to the present embodiment.
Figure 6B:
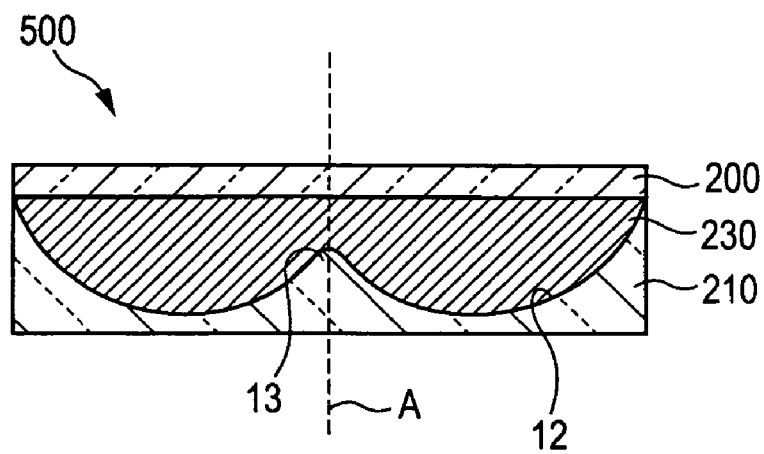
FIG. 6B is a process cross-sectional view (in particular, 3) illustrating a process of manufacturing a microlens according to the present embodiment.
Figure 7:
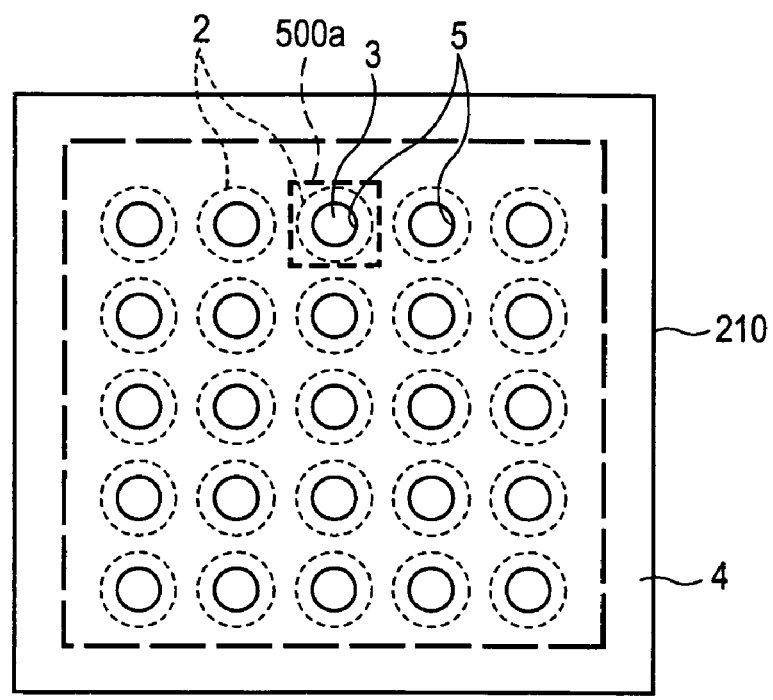
FIG. 7 is a plan view illustrating an arrangement of a mask layer 2 and an opening 5 according to the present embodiment.

Next, a method of manufacturing a microlens according to the present embodiment will be described with reference to FIGS. 4 to 9. FIGS. 4 to 6 are cross-sectional views illustrating a sequence of processes of a method of manufacturing a microlens in accordance with the present embodiment, and FIG. 7 is a plan view illustrating the arrangement of a mask layer 2 and openings 5.

Figure 4B:
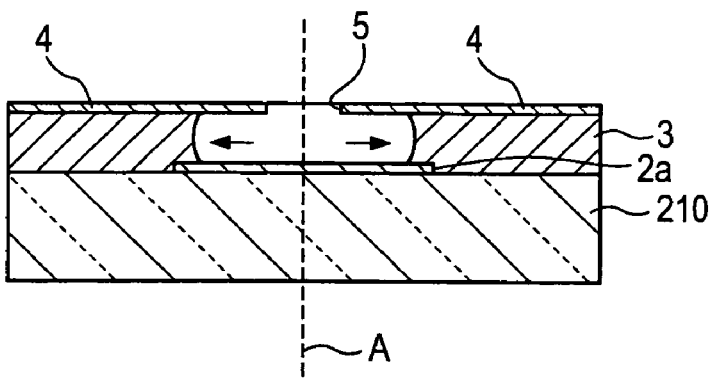
FIG. 4B is a process cross-sectional view (in particular, 1) illustrating a process of manufacturing a microlens according to the present embodiment.

Referring to FIG. 4A, the mask layer 2, which is an example of an 'etching stop layer' according to the invention, is formed on the transparent plate member 210, and an intermediate layer 3 and a mask layer 4, which is an example of the 'etching mask layer' according to the invention, are sequentially formed thereon. The mask layer 2 is, for example, an amorphous silicon layer formed by a chemical vapor deposition (CVD) method, a chromium layer having a hydrofluoric-acid-resistant property, a polysilicon layer or the like. In the present embodiment, the shape of the mask layer 2 within a surface of the transparent plate member 210 is circular, and the mask layer 2 is formed on the transparent plate member 210 in an island shape.

The intermediate layer 3 is formed of a material having an etching rate not less than an etching rate of the transparent plate member 210, as a main material. The intermediate layer 3 is, for example, formed by a CVD method having a desired etching rate, or a sputtering method. In addition, in the description made hereinafter, it is assured that the etching rate of the intermediate layer 3 is higher than that of the transparent plate member 210. As will be described later, when the etching rate of the intermediate layer 3 is higher than the etching rate of the transparent plate member 210, it is possible to make the final shape of the microlens be aspherical, and when the etching rate of the intermediate layer 3 equals the etching rate of the transparent plate member 210, it is possible to make the curved lens surface of the microlens spherical.

The mask layer 4 is formed by the same method as the mask layer 2, and has openings 5 disposed to expose a portion of the surface of the intermediate layer 3. The openings 5 are circular holes each centered on an axis coaxial to the center axis of the mask layer 2, and the size of the openings 5 is smaller than the mask layer 2. To more detail, the diameter of each circular opening 5 is smaller than the diameter of the circular mask layer 2. In other words, the size of the mask layer 2 is bigger than the size of the opening 5 in a lens formation surface of the transparent plate member 210. Further, the planar shape, size, and positional relationship of the mask layers 2 and 4 and the opening 5 are only examples for explaining a method of manufacturing the microlens according to the invention, and it is preferable to form the mask 2 layer on the transparent plate member 210 in an island shape and to dispose each opening 5 so as to be opposite to the mask layer 2, with the intermediate layer 3 disposed therebetween.

Each opening 5 is coaxially positioned on the center axis of the mask layer 2. Accordingly, when the opening 5 and the mask layer 2 are viewed from the top of the mask layer 4, the circumferences of the mask layer 2 and the opening 5 are positioned concentrically. In addition, a description will be made hereinafter assuming that the planar shapes of the mask layer 2 and the opening 5 are circular, however, the method of manufacturing the microlens according to the invention does not exclude other planar shapes for the planar shapes of the mask layer 2 and the opening 5, and the planar shapes of the mask layer 2 and the opening 5 may include a regular triangle, a square, a regular octagon, and a planar shape having rotational symmetry with respect to a center axis.

Hereinafter, the arrangement of the mask layer 2 and the opening 5 will be described with reference to FIG. 7.

Referring to FIG. 7, the mask layer 2, the intermediate layer 3, and the mask layer 4 are sequentially formed on the transparent plate member 210, and a method of manufacturing the microlens described with reference to FIGS. 4 to 6 corresponds to the cross-sectional view illustrating a process of etching the intermediate layer 3 and the transparent plate member 210 from one opening 5 among a plurality of the openings 5 formed in the mask layer 4.

The mask layer 2 is formed in an island shape at each of the lens formation regions 500a of the transparent plate member 210, and the lens formation regions 500a are defined to comply with the arrangement of a plurality of pixels disposed to overlap the microlens array plate 20 after the microlenses are prepared, and are arranged in a matrix along vertical and longitudinal directions in the figure. By collectively etching the intermediate layer 3 and the transparent plate member 210 from the plurality of openings 5 disposed in the mask layer 4, a curved lens surface of the microlenses can be separately formed, and the microlens array plate 20 having a plurality of the microlenses described with reference to FIGS. 1 to 3 can be formed.

Referring back to FIG. 4B, the intermediate layer 3 is isotropically etched from the opening 5. In this case, the term 'isotropically' means that uniform etching is carried out on the intermediate layer 3 outward from the opening 5 positioned coaxially on the center axis A of the mask layer 2 in the figure, and the intermediate layer 3 is etched, for example, in the longitudinal direction by wet etching in the present embodiment. Further, the intermediate layer 3 is etched in the vertical direction, that is, a thickness direction in the figure: however, etching on the intermediate layer 3 is stopped in the thickness direction by the mask layer 2, and progresses only in the longitudinal direction.

Figure 4C:
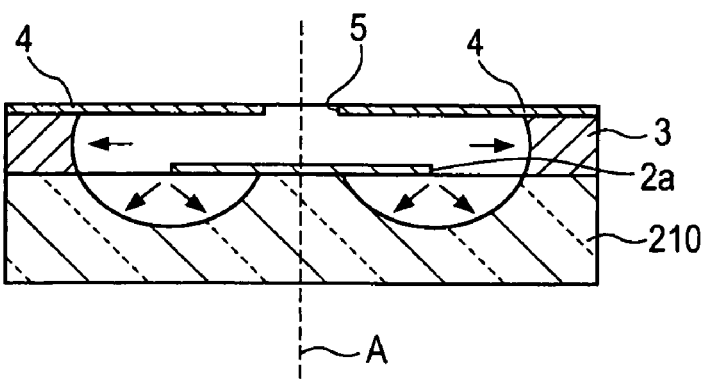
FIG. 4C is a process cross-sectional view (in particular, 1) illustrating a process of manufacturing a microlens according to the present embodiment.

Referring to FIG. 4C, when the etching on the intermediate layer 3 further progresses to expose a surface of the transparent plate member 210 from a side of the mask layer 2, the transparent plate member 210 is etched with the side of the mask layer 2 as a starting point. In this case, the opening 5 is disposed coaxially with the center axis of the mask layer 2 in the present embodiment, so that the distance from the center of the opening 5 to a side part 2a of the mask layer 2 is equal in the entire side part 2a of the mask layer 2. Accordingly, an etched surface of the intermediate layer 3 simultaneously reaches the entire side part 2a of the mask layer 2, and etching on the transparent plate member 210 is simultaneously initiated in the entire side part 2a of the mask layer 2 with the side part 2a of the mask layer 2 as a starting point. The etching on the transparent plate member 210 progresses toward the inside and outside of the mask layer 2 along the longitudinal direction and downward in the figure with the side part 2a of the mask layer 2 as a starting point, and isotropic etching is carried out on a region covered with at least the mask layer 2 of the transparent plate member 210, as will be described later.

Figure 5A:
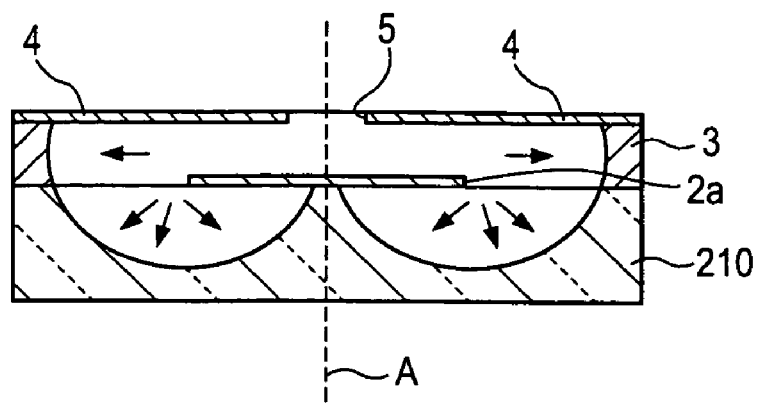
FIG. 5A is a process cross-sectional view (in particular, 2) illustrating a process of manufacturing a microlens according to the present embodiment.

Referring to FIG. 5A, etching is carried out on the transparent plate member 210 with the side part 2a of the mask layer 2 as a starting point. Etching is carried out toward the inside and outside from both side parts 2a of the mask layer 2 in the transparent plate member 210 in the figure, and an etched surface having a concentric contour line outward from the center axis A is formed when the transparent plate member 210 is viewed from above in the figure.

Figure 5B:
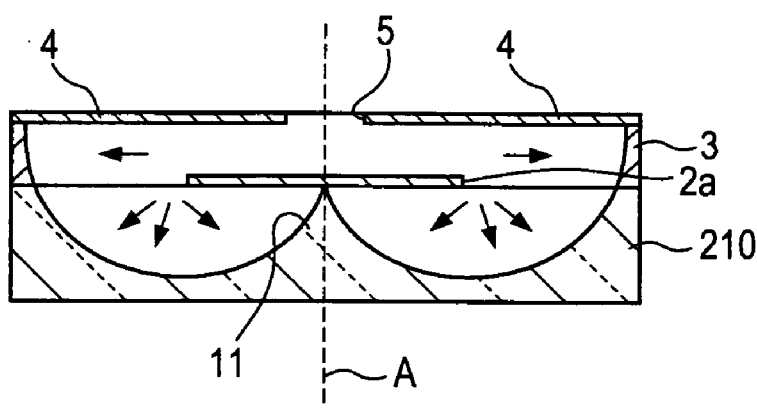
FIG. 5B is a process cross-sectional view (in particular, 2) illustrating a process of manufacturing a microlens according to the present embodiment.

Referring to FIG. 5B, when etching is further carried out on the transparent plate member 210, the etched surface where the transparent plate member 210 is etched toward the center axis A from the side part 2a of the mask layer 2 comes in contact with the center axis A below the mask layer 2, thereby forming a convex part 11 having a skirt outward from the center axis A of the mask layer 2. The convex part 11 is an example of the central lens section according to the invention, and has a pointed part protruding toward the top in the figure.

Figure 5C:
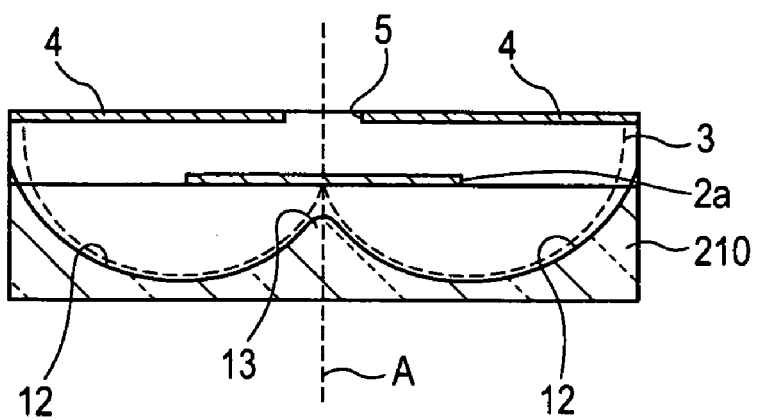
FIG. 5C is a process cross-sectional view (in particular, 2) illustrating a process of manufacturing a microlens according to the present embodiment.

Referring to FIG. 5C, when etching is further carried out, the top part of the convex part 11 is spaced apart from the mask layer 2. Thereby, a convex part 13 where the top part of the convex part 11 has a smooth surface is formed. A concave part 12 extending along the peripheral direction of the center axis A is formed around the convex part 13. In this case, the convex part 13 where etching has been more carried out than at the convex part 11 corresponds to an example of the central lens section according to the invention. Accordingly, to form the microlens, the etching process may stop once the convex part 11 has been formed, or the etching process may progress until the convex part 13 is formed. Further, when the convex part 11 is used as the central lens section of the microlens, a curved surface extending around the convex part 11 becomes a spherical surface.

Here, the shape of the etched surface due to a difference of etching rate of the intermediate layer 3, that is, the shape of the curved lens surface to be finally formed, will be described. The dotted line in the figure denotes an etched surface shown in FIG. 5B, and the intermediate layer 3 has an etching rate higher than the transparent plate member 210, so that the intermediate layer 3 on the transparent plate member 210 outside the side part 2a of the mask layer 2 is etched faster along the longitudinal direction than the transparent plate member 210 in the figure. Accordingly, in the transparent plate member 210, in a region close to both ends of the figure, a surface exposed by removing the intermediate layer 3 is first etched in addition to etching carried out from the side part 2a of the mask layer 2. In the figure, a region outside the side part 2a of the mask layer 2 of the transparent plate member 210 has an amount of etching larger than an amount of etching carried out toward the center axis A from the side part 2a of the mask layer 2. That is, a surface etched toward the center axis A from the side part 2a of the mask layer 2 constitutes a part of the spherical surface having the side part 2a of the mask layer 2 as a center, while a surface etched toward an outside of the side part 2a of the mask layer 2 becomes a spherical surface having a radius of curvature different from that of the surface etched below the mask layer 2, thereby constituting an aspherical surface that is continuous with the surface etched below the mask layer 2. Accordingly, the etched surface of the transparent plate member 210 becomes a curved lens surface where curved surfaces having different radii of curvature are continuously connected below and outside the mask layer 2, respectively.

As such, when etching is further carried out from the state shown in FIG. 5B, a convex part 13 having a smoothly curved surface and a concave part 12 having the same depth as the convex part 13 and a concentric shape around the convex part 13 are formed in the transparent plate member 210 when the etching is stopped. Further, a boundary between the first curved lens surface and the second curved lens surface according to the invention means a boundary between curved lens surfaces formed in the peripheral lens section and the central lens section of the microlens, with a step of further carrying out etching after the convex part 11 is formed as a base point. Specifically, a surface of the convex part 13 formed by further etching the convex part 11 corresponds to an example of the second curved lens surface, and a surface of the concave part 12 corresponds to an example of the first curved lens surface. By filling a lens formation material, such as a transparent resin, in a subsequent process so as to cover the convex part 13 and the concave part 12, a microlens having curved lens surfaces reflecting the curved surface of the convex part 13 and a curved surface within the concave part 12 can be manufactured. In more detail, the central lens section of the microlens is more concave than the peripheral lens section around the central lens section to be described later, so that the microlens having different curved lens surfaces in the central lens section and the peripheral lens section can be manufactured.

Subsequently, referring to FIG. 6A, the mask layer 2 and the mask layer 4 are removed from the transparent plate member 210 where the convex part 13 and the concave part 12 are formed. The mask layer 2 is suspended from the transparent plate member 210 by etching the transparent plate member 210, so that it is removed when the mask layer 4 is removed.

Figure 8:
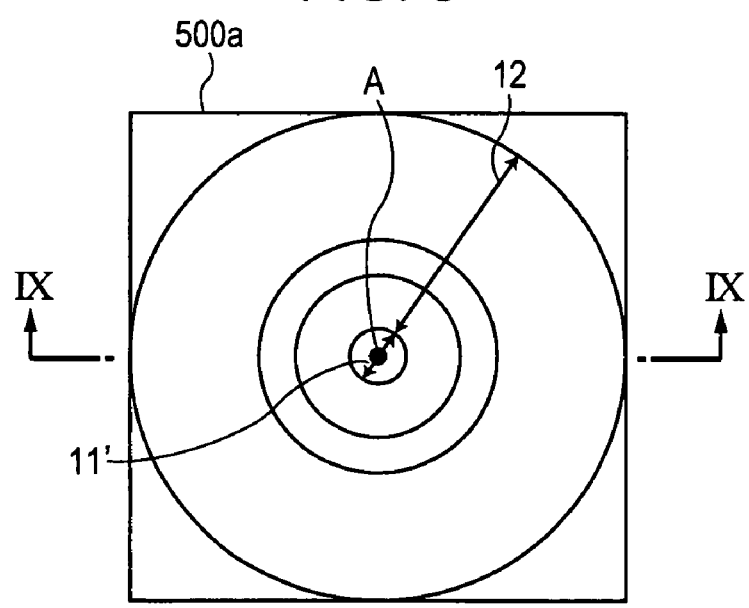
FIG. 8 is a plan view illustrating a transparent plate member 210 when seen from an etching surface according to the present embodiment.
Figure 9:
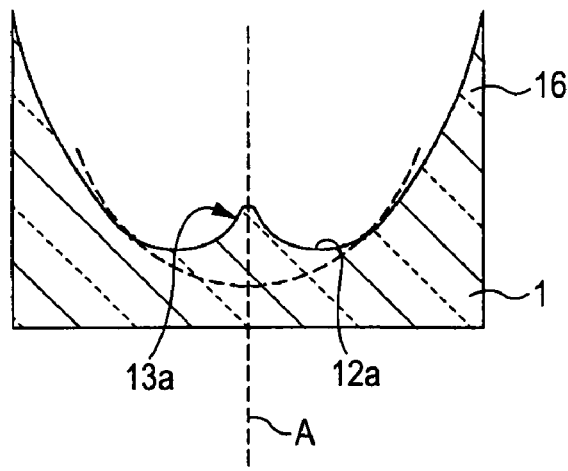
FIG. 9 is a cross-sectional view taken along the line IX-IX' of FIG. 8.
Figure 10:
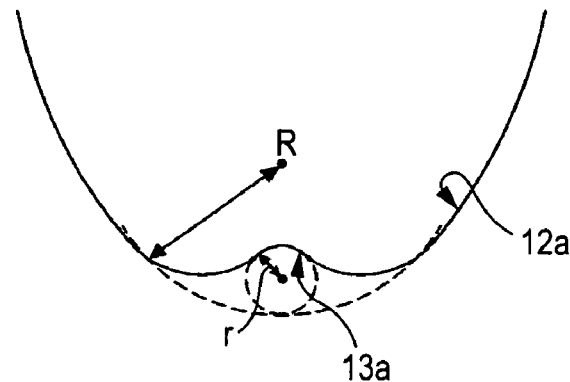
FIG. 10 is an enlarged view of FIG. 6A.

Hereinafter, the shapes of the convex part 13 and the concave part 12 formed in the transparent plate member 210 will be described in detail with reference to FIGS. 8 to 10. FIG. 8 is a plan view when the transparent plate member 210 is seen from an etching plane side, and FIG. 9 is a cross-sectional view taken along the line IX-IX' of FIG. 8. FIG. 10 is an enlarged view of FIG. 9.

Referring to FIGS. 8 and 9, the convex part 13 and the concave part 12 are formed within the lens formation region 500a outward from the center axis A of the mask layer 2. One microlens having curved lens surfaces, such as the surfaces of the convex part 13 and the concave part 12, is disposed in one pixel among a plurality of pixels, for example, included in a liquid crystal device, so that the size of the lens formation region 500a including the convex part 13 and the concave part 12 is such that it can be accommodated within one pixel region.

Referring to FIG. 9, a curved surface 12a within the concave part 12 is symmetrical with respect to the center axis A and uniformly extends along the circumference of the convex part 13. The height from the bottom of the concave part 12 to the top of the convex part 13 is lower than the height from the bottom of the concave part 12 to a periphery 16 of the concave part 12. A surface of the convex part 13 constitutes the curved surface 13a. The curved surface 12a corresponds to an example of the first curved lens surface according to the invention, and the curved surface 13a corresponds to an example of the second curved lens surface according to the invention. Accordingly, by burying a lens formation material such as a transparent resin so as to cover the convex part 13 and the concave part 12, a microlens having curved lens surfaces reflecting the shapes of the curved surfaces 12a and 13a can be manufactured. Also, the microlens configured to have the curved surfaces 13a and 12a as a continuously curved lens surface may be formed without filling the lens formation material, such as the transparent resin.

Referring to FIG. 10, the curved surface 13a and 12a will be described in detail. The curved surface 13a has its center positioned within the convex part 13 and constitutes a spherical surface defined with a radius of curvature r, and the curved surface 12a has its center inside the concave part 12, that is, has its center positioned in a space surrounded by the curved surface 12a, and constitutes a portion of the curved surface defined with a radius of curvature R. Further, the radius of curvature R is larger than the radius of curvature r. The curved surfaces 13a and 12a constitute a continuously curved lens surface, with through an inflection point therebetween. The curved surface 12a constitutes an aspherical surface with both ends thereof being slightly deviated from the spherical surface. In addition, the curved surface 13a constitutes a spherical surface with a radius of curvature r in the present embodiment: however, the curved surface 13a may be formed as a more smooth surface than the spherical surface by further carrying out etching on the transparent plate member 210. On the contrary, by quickly terminating etching on the transparent plate member 210, the convex part 13 may be formed as a conical shape, and a point on the center axis A may intersect with the curved surface 13a.

Referring back to FIG. 6B, an adhesive having a transmissive property is coated as a lens formation material so as to cover the convex part 13 and the concave part 12. The cover glass 14 is pressed against the transparent plate member 210 and the adhesive is cured, thereby forming the adhesive layer 230. As a result, a microlens 500 having curved lens surfaces, each reflecting the shape of the convex part 13 and the concave part 12, can be formed.

Structure of Microlens

Figure 11:
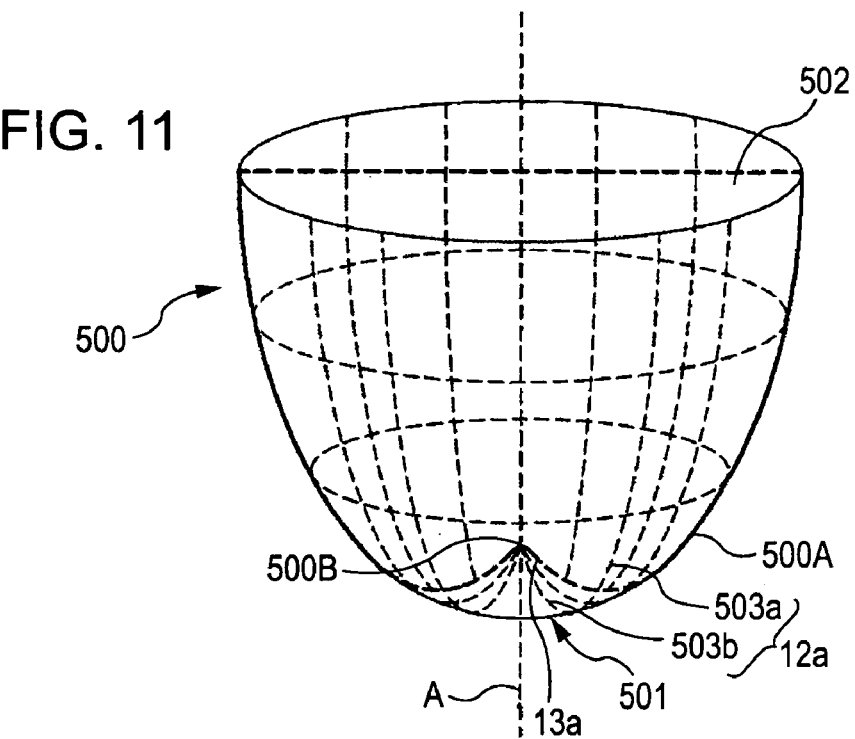
FIG. 11 is a perspective view illustrating an outer shape of a microlens according to the present embodiment.

Next, the structure of the microlens will be described with reference to FIGS. 11 to 13. FIG. 11 is a perspective view illustrating the outer shape of the microlens in accordance with the invention. FIG. 12 is a view illustrating the relationship between the shape of the microlens and an optical intensity distribution of light focused by the microlens. FIG. 13 is a comparative view illustrating an optical intensity distribution of the conventional microlens and an optical intensity distribution of the microlens according to the present embodiment. In addition, the microlens according to the present embodiment shown in FIGS. 11 to 13 is a microlens formed by carrying out the process of manufacturing the microlens in the description of FIGS. 4 to 10. Hereinafter, common reference numerals are applied to common parts for description in FIGS. 4 to 10. The microlens according to the present embodiment has a curved lens surface rotating around the center axis A: however, the shape of the curved lens surface is not limited to that which is rotationally symmetrical with respect to the center axis. For example, it does not exclude the case in which the curved lens surface is asymmetrical with respect to the center axis in a cross-section of the microlens taken along a plane including the center axis of the microlens.

Referring to FIG. 11, the microlens 500 is configured to have a peripheral lens section 500A extending around the center axis A of the microlens 500, and a central lens section 500B surrounded by the peripheral lens section 500A.

The peripheral lens section 500A is formed by filling a concave part, which is formed by etching the transparent plate member 210, with a lens formation material having a high refractive index from the transparent plate member 210 shown in FIGS. 4 to 6, and has a curved lens surface reflecting the shape of the curved surface of the concave part 12 of the etched transparent plate member 210. The curved lens surface 12a corresponds to an example of the first curved lens surface according to the invention.

The central lens section 500B is surrounded by the peripheral lens section 500A while having a curved lens surface 13a more concave than the peripheral lens section 500A. That is, the curved lens surface 13a corresponds to an example of the second curved lens surface according to the invention, and in particular, it is concave toward the bottom surface 502. The curved lens surface of the microlens 500 is configured to have the curved lens surface 13a and the curved lens surface 12a smoothly connected with an inflection point being interposed therebetween, and the microlens 500 is configured to have the central lens section 500B and the peripheral lens section 500A.

The central lens section 500B constitutes a part of the curved lens surface having a radius of curvature r. Among curved lens surfaces 12a of the peripheral lens section 500A, a curved lens surface of a region adjacent to the central lens section 500B constitutes a part of the spherical surface having a radius of curvature R, and a curved lens surface occupying a region closer to the outside of the microlens 500 among the curved lens surfaces 12*a* forms a spherical surface having a bigger radius of curvature. A ridge 501, which is a top of the peripheral lens section 500A, protrudes with respect to the bottom surface 502 of the microlens 500, and extends around the center axis A, which is an example of a normal line according to the invention. A curved surface 503*a* extending outward from the ridge 501 in the figure and a curved surface 503*b* extending inward constitute the curved lens surface 12*a*.

Referring to FIG. 12, an optical intensity distribution D of light focused by the microlens 500 has the same intensity in a concentric shape within a two-dimensional plane as a focal plane. The optical intensity distribution D is divided into a central region I corresponding to the central lens section 500B of the microlens 500, a circumferential region II extending in a ring shape outward from the central region I, and a circumferential region III extending outward from the circumferential region II. Among these regions, the circumferential region II is a region having a stronger intensity than those of the other regions, and has most of the light components focused by the peripheral lens section 500A extending along the circumference of the center axis A of the microlens 500. The circumferential region II is a region extending in a ring shape around the central region I, so that its optical intensity is weaker as compared to a case in which light is focused on one point. Accordingly, when light is focused on the pixel by the microlens 500, the light can be prevented from being focused on one point of the pixel, which can thus suppress each part included in the pixel from being degraded due to the light. For example, an orientation layer or a liquid crystal in the liquid crystal device can be prevented from being degraded due to focused light.

Figure 13A:
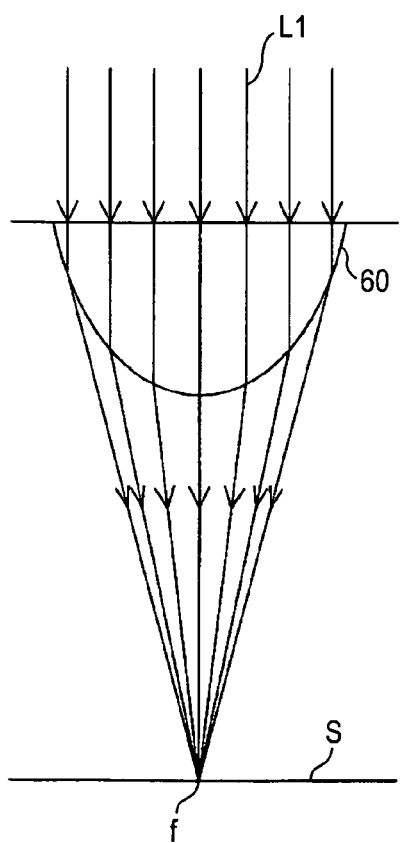
FIG. 13 is a view schematically illustrating light paths of a microlens according to the present embodiment and a microlens according to the related art.

Referring to FIG. 13A, the microlens 60 acts as a convex lens having one convex section on a cross-section taken along the conventional microlens 60 in a plane including the center axis. Light L1 transmitted through the microlens 60 is focused in a predetermined region of the two-dimensional plane S as a focal plane. The light L1 transmitted through the microlens 60 is focused, for example, at the focal point f of the microlens 60. In particular, when the microlens 60 is an aspherical lens, the light is focused at the focal point f with good precision, so that each component disposed in the region positioned in the focal point, for example, an orientation layer within the pixel is apt to be deteriorated. Further, even when the focal point is not positioned on the two-dimensional plane S, light focused by the microlens 60 is focused in a narrow region within the two-dimensional plane, which is a light-emitting point.

Figure 13B:
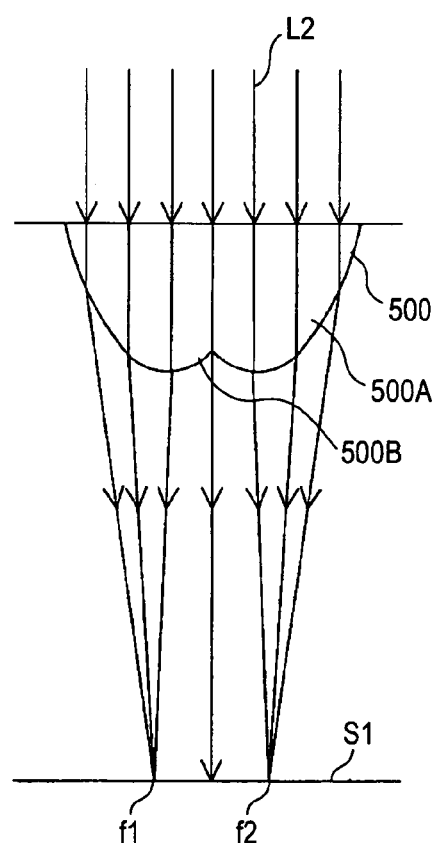

On the other hand, referring to FIG. 13B, in accordance with the microlens 500 of the present embodiment, the light L2 is focused by each of the peripheral lens section 500A and the central lens section 500B which are symmetrical in the right and left directions in a cross-section taken along the surface including the center axis A of the microlens 500, so that the light focused on one point in the related art can be distributed. Specifically, peripheral lens sections positioned at both the right and left sides in the figure have focal points f1 and f2 in a two-dimensional plane S1 serving as a focal plane, respectively, and the light L2 focused by the peripheral lens section 500A and the central lens section 500B is focused at the focal points f1 and f2. The focal points f1 and f2 are positioned on a circle having, as a center, an intersection between the center axis A and the two-dimensional plane S1 serving as the focusing plane, which allows the optical intensity to be distributed in the two-dimensional plane S1 as compared to a case in which light is focused at one point. Accordingly, it is possible to reduce the deterioration of each component disposed within the pixel by means of the microlens 500. Further, the microlens 500 has a function of making light focused within a predetermined region, that is, within the pixel disposed so as to face the microlens 500 in the same manner as with the conventional microlens, so that the display performance of the pixel can be enhanced by increasing the optical transmittance of the pixel.

Electro-optical Device

Figure 14:
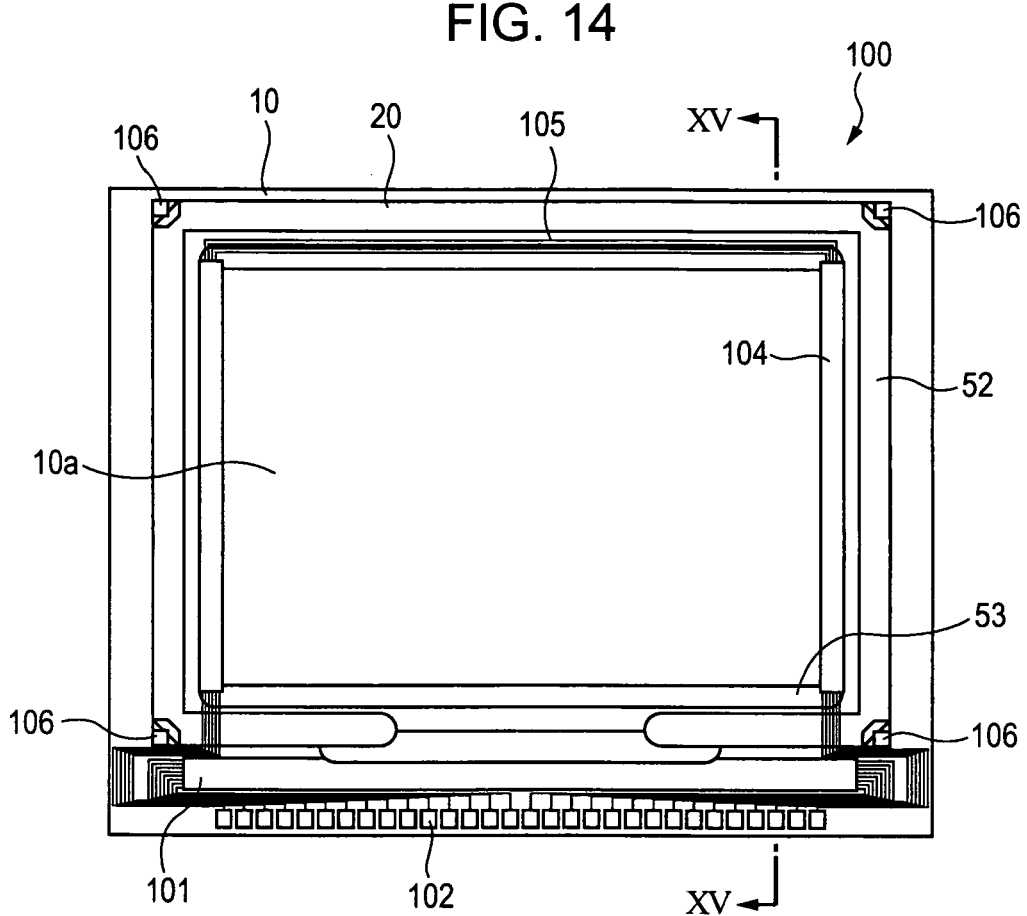
FIG. 14 is a plan view illustrating a liquid crystal device, which is an example of an electro-optical device according to the present embodiment.
Figure 15:
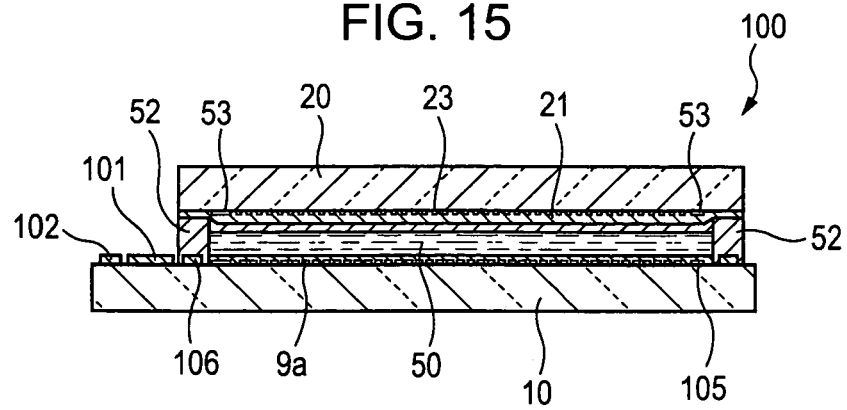
FIG. 15 is a cross-sectional view taken along the line H-H' of FIG. 14.

Next, the electro-optical device to which the microlens according to the present embodiment is applied will be described with reference to FIGS. 14 and 17. FIG. 14 is a plan view when seen from the microlens array plate used as the counter substrate together with each component formed on the TFT array substrate, and FIG. 15 is a cross-sectional view taken along the line H-H' of FIG. 14. Here, a TFT active matrix driving type liquid crystal device having a built-in driving circuit will be described as one example of the electro-optical device. In addition, the microlens array plate of the present embodiment has the plurality of microlens arranged in accordance with the invention.

Referring to FIGS. 14 and 15, the liquid crystal device 100 has a TFT array substrate 10 and a microlens array plate 20, used as a counter substrate, arranged opposite to the TFT array substrate 10. A liquid crystal layer 50 is interposed between the TFT array substrate 10 and the microlens array plate 20, which are bonded to each other by a sealing member 52 provided in a sealing region located in a circumference of the image display region 10*a*.

The sealing member 52 is made of, for example, a UV curing resin, a thermosetting resin or the like for bonding both substrates each other, and is cured by UV irradiation, heating or the like after it is coated on the TFT array substrate 10 in a manufacturing process. In addition, gap members such as glass fibers or glass beads for making an interval (i.e. a gap between both substrates) between the TFT array substrate 10 and the microlens array plate 20 be a predetermined value are dispersed in the sealing member 52. That is, the electro-optical device of the present embodiment is one for a light valve of the projector and is suitable for carrying out a small-sized and enlarged display.

A frame shielding layer 53, having a light shielding property, which defines a frame region of the image display region 10*a* is disposed in the microlens array plate 20 in parallel with an inner side of the sealing region where the sealing member 52 is disposed. However, a part or total of the frame shielding layer 53 may also be disposed as a built-in shielding layer in the TFT array substrate 10.

Among circumferential regions located in a circumference of the image display region 10*a*, a data line driving circuit 101 and external circuit connection terminals 102 are provided along one side of the TFT array substrate 10 in a region located outside the sealing region where the sealing member 52 is formed. In addition, the scanning line driving circuit 104 is provided along two sides adjacent to the one side and is covered by the frame shielding layer 53. Moreover, in order to connect two scanning line driving circuits 104 provided at both sides of the image display region 10*a*, a plurality of wiring lines 105 is provided along the rest one side of the TFT array substrate 10 and covered by the frame shielding layer 53.

Up and down conductive members 106, acting as up and down conductive terminals between both substrates, are disposed at four corners of the microlens array plate 20. In the meantime, up and down conductive terminals are provided in regions corresponding to these corners in the TFT array substrate 10. By means of these components, an electrical conductance can be made between the TFT array substrate 10 and the microlens array plate 20.

Referring to FIG. 15, an orientation layer is formed on the pixel electrodes 9a after TFTs for switching pixels or wiring lines such as scanning lines and data lines are formed on the TFT array substrate 10. Meanwhile, besides counter electrodes 21, a shielding layer having a lattice shape or a stripe shape, and even an orientation layer located at the top layer are formed on the microlens array plate 20, however, a detailed structure thereof will be described later. Further, the liquid crystal layer 50 is composed of liquid crystals made by mixing one kind or several kinds of nematic liquid crystals, and has a predetermined orientation state between a pair of these orientation layers.

In addition to such a data line driving circuit 101 and a scanning line driving circuit 104, a sampling circuit for sampling an image signal on the image signal to supply the sampling signal to the data line, a precharge circuit for supplying a precharge signal, having a predetermined voltage level, to each of the data lines prior to supply of the image signal, a test circuit for testing a quality, defect or the like of the corresponding electro-optical device at the time of manufacturing or shipment, and so forth may also be formed on the TFT array substrate 10 shown in FIGS. 14 and 15.

Figure 16:
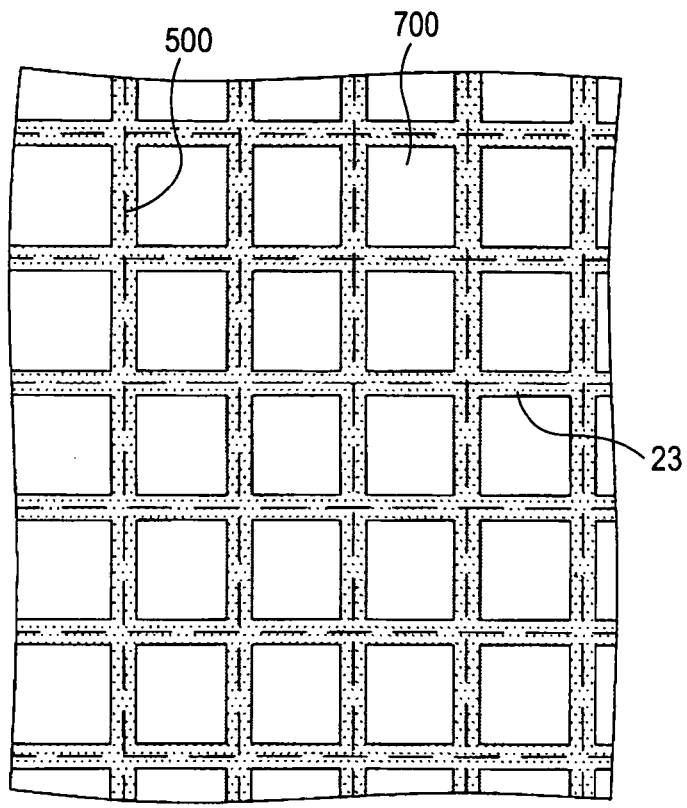
FIG. 16 is a plan view schematically illustrating an arrangement of a microlens and a shielding layer disposed in the microlens array plate according to the present embodiment.

Detailed structure and function of the microlens array plate 20 provided in the above-described liquid crystal device 100 will be described with reference to FIGS. 16 and 17. FIG. 16 is a plan view schematically illustrating an arrangement of the light shielding layer 23 and the microlens 500 provided in the microlens array plate 20, and FIG. 17 is a more detailed cross-sectional view illustrating a structure of the cross-section of the liquid crystal device 100 with respect to a plurality of pixels. That is, a detailed function of the microlens will be described with reference to FIG. 17.

Referring to FIG. 16, the microlens array plate 20 has the light shielding layer 23 formed on the transparent substrate 210, and the light shielding layer 23 has a lattice shaped planar pattern. The microlens array plate 20 has a non-opening region defined by the light shielding layer 23, and a region divided by the light shielding layer 23 becomes an opening region 700. Further, the light shielding layer 23 may be formed to have a stripe shape, and the non-opening region may be defined by various components, such as capacitive electrodes 300 or data lines 6a provided at a side of the TFT array substrate 10 and the light shielding layer 23.

Each microlens 500 is disposed to correspond to each pixel. Specifically, the microlens 500 having a planar and rectangular shape is provided in a region including at least a part of the opening region 700 and the non-opening region located at circumference of the opening region 700, with respect to each pixel in the microlens array plate 20.

Figure 17:
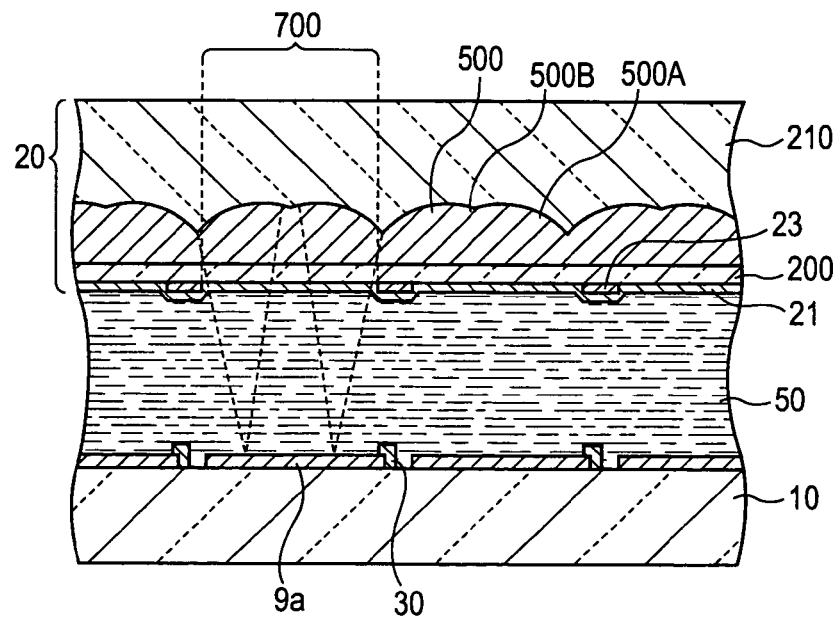
FIG. 17 is a cross-sectional view illustrating the cross-section shown in FIG. 15 in detail.

Referring to FIG. 17, a counter electrode 21 composed of a transparent conductive layer is formed on the transparent plate member 210 to cover the light shielding layer 23. Further, an orientation layer, which is not shown, is formed on the counter electrode 21. Furthermore, a color filter may be formed in each opening region 700 on the transparent substrate 210.

On the other hand, a pixel electrode 9a is formed in a region corresponding to each opening region 600 on the TFT array substrate 10. Further, electronic elements, such as TFTs 30 for switching pixels, various wiring lines such as scanning lines 11a and data lines 6a for driving the pixel electrodes 9a, and storage capacitors 70 are respectively formed in the non-opening regions. With such a configuration, it is possible to maintain a pixel aperture ratio in the corresponding electro-optical device relatively high.

Light, such as projection light, incident on the microlens array plate 20 is focused by the microlens 500 which is formed by the central lens section 500B and the peripheral lens section 500A as one body. Further, a schematic optical path of the light focused by the microlens 500 is illustrated as a dashed dot line in FIG. 17. The light focused by the microlens 500 is transmitted through the liquid crystal layer 50 to be irradiated onto the pixel electrode 9a, which then passes through the pixel electrode 9a to be emitted from the TFT array substrate 10 as display light. Here, among light components incident on the microlens array plate 20 from the upper side of the figure in which a light source is disposed, light propagating toward the non-opening region 23 can also be incident on the opening region 700 by a focusing action of the microlens 500, so that an actual aperture ratio can increase for each pixel. In addition, the peripheral lens section of each microlens 500 can be made as an aspherical lens. Accordingly, the microlens 500 including the peripheral lens section 500A can be made to have a small aberration, and thus optical usage efficiency can be enhanced. Further, an optical intensity distribution can be dispersed on the pixel electrode 9a so as not to have light focused on one point of the pixel electrode 9a while focusing light incident on the microlens 500 from the light source by means of each of the peripheral lens sections 500A positioned at a circumference of the central lens section 500B. Furthermore, the central lens section 500B can also act as a concave lens, so that it is possible to prevent light from being focused on one point in a region having a high optical intensity. Also, an optical transmittance and a contrast can be enhanced at each pixel while making the microlens 500 in its entirety act as a lens. As a result, according to the microlens 500, by suppressing pixels from being deteriorated, a lifetime of the electro-optical device, such as the liquid crystal device, can be increased, and an image having a high quality can be displayed.

As described above, in the liquid crystal device 100, which is an example of the electro-optical device according to the present embodiment, instead of providing the data line driving circuit 101 or the scanning line driving circuit 104 on the TFT array substrate 10, a driving large scale integrated circuit (LSI) mounted on a tape automated bonding (TAB) substrate may be electrically and mechanically connected to an external circuit connection terminal 102 via an anisotropic conductive film. In addition, a polarization film, a phase difference film, a polarization plate or the like may be arranged in a predetermined direction on respective sides where projection light of the microlens array plate 20 is incident and exiting light of the TFT array substrate 10 is emitted according to an operation mode of the twisted nematic (TN) mode, a vertically aligned (VA) mode, a polymer dispersed liquid crystal (PDLC) mode, or each of the normally white mode/normally black mode.

Further, in the above-described electro-optical device, a microlens array plate 20, having arranged with a plurality of microlenses shown in FIG. 11, is employed as a counter substrate, however, such a microlens array plate 20 may also be used as the TFT array substrate 10. Alternatively, it is possible to attach the microlens array plate 20 to a TFT array substrate 10 side by simply using a counter substrate (other than the microlens array plate 20) where counter electrodes or an orientation layer is formed on a glass substrate or the like. That is, the microlens of the invention can be incorporated in the TFT array substrate 10 or attached thereto.

Furthermore, FIG. 17 shows a structure of the liquid crystal device 100 configured to arrange the microlenses 500 such that the peripheral lens section 500A of the microlens 500 is concaved toward a pixel electrode side, which is an emitting side of light, however, the microlens array plate 20 may be arranged so as to have the peripheral lens section 500A of the microlens 500 concaved toward an upper side in the same figure.

Electronic Apparatus

An embodiment of a projection type color display device, which is an example of an electronic apparatus using the above-described electro-optical device as a light valve, will be described with respect to a entire structure thereof, in particular, an optical structure. Here, FIG. 18 is a cross-sectional view schematically illustrating a projection type color display device.

Figure 18:
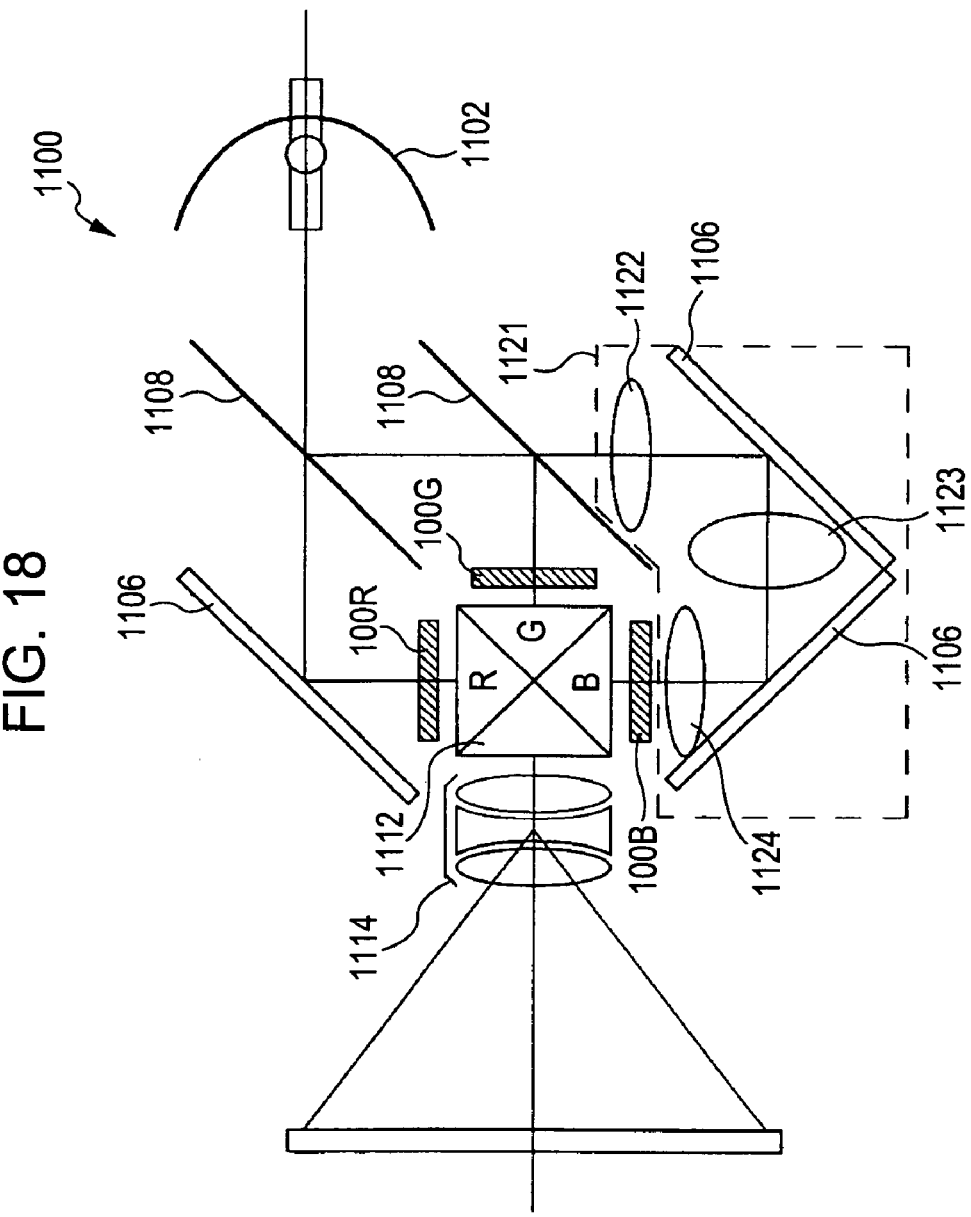
FIG. 18 is a cross-sectional view illustrating an example of an electronic apparatus according to the present embodiment.

Referring to FIG. 18, a liquid crystal projector 1100, which is an example of a projection type color display device, includes three liquid crystal modules, each having a liquid crystal device having a driving circuit mounted on a TFT array substrate, and is configured to be a projector using the three liquid crystal modules as light vales 100R, 100G, and 100B for R, G, and B colors, respectively. When projection light is emitted from a lamp unit 1102 of a white color light source, such as a metal halide lamp, in the liquid crystal projector 1100, it is divided into optical components R, G, and B corresponding to primary colors R, G, and B by three sheets of mirrors 1106 and two sheets of dichroic mirrors 1108, which are guided into the light valves 100R, 100G, and 100B corresponding to the respective colors. At that time, in particular, the B light is guided through a relay lens system 1121 composed of an incident lens 1122, a relay lens 1123, and an exiting lens 1124 to prevent a light loss due to a long optical path. And optical components corresponding to the primary colors modulated by the light valves 100R, 100G, and 100B are recombined by a dichroic prism 1112, which are projected as a color image through a projection lens 1114.

The invention is not limited to the above-described embodiments, and may be properly changed within a range not departing from a spirit or a gist of the invention read from the claims and the description in their entirety, and a method of manufacturing the microlens accompanying the change, a microlens manufactured by this method, an electro-optical device having the microlens, and an electronic apparatus configured to have the electro-optical device are also included in the technical range of the invention.

What is claimed is:

1. A method of manufacturing a microlens, comprising:
    forming on a transparent substrate an etching stop layer in a lens formation region where a curved lens surface of the microlens is to be formed, the etching stop layer having an island shape as a planar shape thereof;
    forming an intermediate layer on the etching stop layer;
    forming an etching mask layer on the intermediate layer, the etching mask layer having an opening at a position facing the etching stop layer; and
    etching, by means of isotropic etching, the intermediate layer from the opening and the transparent substrate and the intermediate layer from a side of the etching stop layer.
2. The method according to claim 1,
    wherein an etching rate of the intermediate layer is higher than that of the transparent substrate.
3. The method according to claim 1,
    wherein the planar shape of the etching stop layer is circular.
4. The method according to claim 1,
    wherein the planar shape of the opening is circular.
5. The method according to claim 1,
    wherein the opening and the etching stop layer are coaxially positioned in plan view from the transparent substrate.
6. The method according to claim 1,
    wherein, in the lens formation region, the size of a region where the etching stop layer is formed is larger than the size of a region where the opening is formed.

* * * * *